United States Patent Office
3,029,244
Patented Apr. 10, 1962

3,029,244
AROYLPIPERIDINOLS AND ESTERS THEREOF
Robert E. Lyle, Jr., Durham, N.H., and Henry J. Trosciniec, Niagara Falls, N.Y., assignors to Research Corporation, New York, N.Y., a corporation of New York
No Drawing. Filed Aug. 31, 1959, Ser. No. 836,898
20 Claims. (Cl. 260—294.3)

This invention relates to a new group of aroylpiperidinols and their esters having local anesthetic action and to methods and intermediates for making the same.

The new compounds of the invention are of the general formula

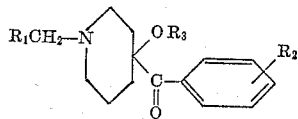

(I)

wherein $R_1$ is hydrogen, lower alkyl or phenyl, $R_2$ is hydrogen or lower alkyl, and $R_3$ is hydrogen, or an organic carboxylic acid ester group, the ester (or hydroxyl) and aroyl groups being both attached to either the 3- or the 4- position of the piperidine ring. The local anesthetic action of the compounds of the invention is particularly effective when they are applied in the form of aqueous solutions of their water soluble acid salts.

The new compounds can be prepared by reacting corresponding 3-(4-)-halo-3-(4-)aroylpiperidines III, obtained by halogenating the N-alkyl or aralkyl aroylpiperidines (II) with chlorine or bromine, with sodium alkylates in alcoholic media to produce the epoxyethers (IV), and thereafter reacting the epoxyethers with a carboxylic acid in an organic solvent medium to produce the esters or with an inorganic acid to produce the aroylpiperidinols, as illustrated in the following reaction scheme as applied to the 4-piperidine series:

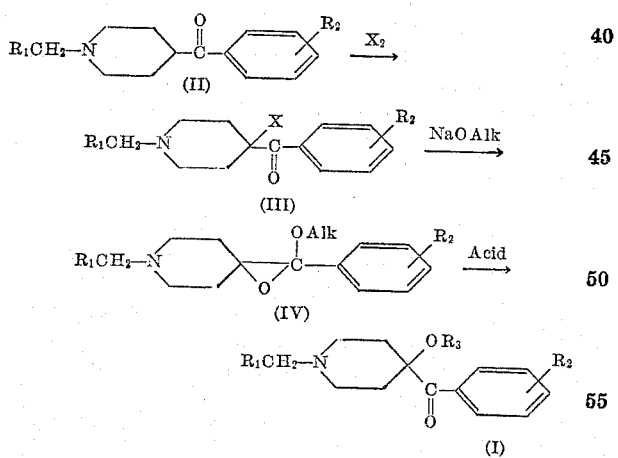

In the formulas $R_1$, $R_2$ and $R_3$ have the meanings given above, $X_2$ represents chlorine or bromine, and Alk represents a lower alkyl, particularly methyl or ethyl.

The piperidinols may also be made by hydrolysis of the esters, for example, with hydrochloric acid.

The 3- and 4-aroylpiperidines may be obtained in a number of ways from readily accessible compounds by the known methods illustrated in the following reactions:

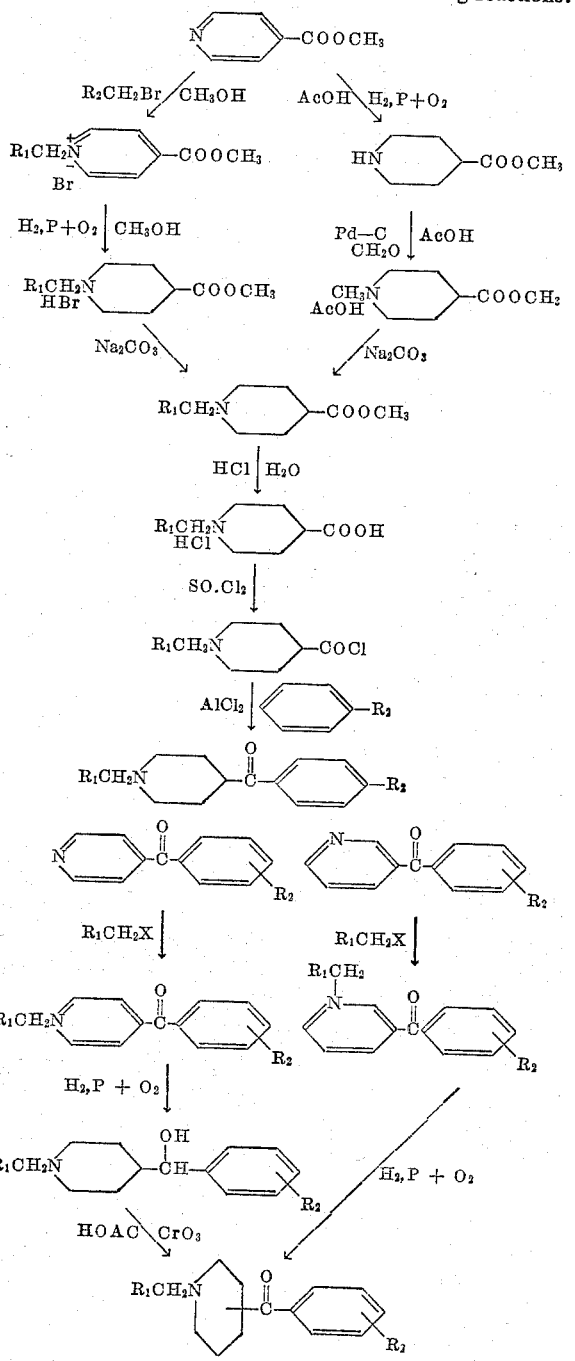

The following examples are illustrative of the principles of the invention:

EXAMPLE 1

Methyl 1-Methyl Isonipecotate (Procedure A)

A mixture of 20.0 g. of methyl isonicotinate and 20 ml. of methyl bromide in 100 ml. of methanol in a suction flask was stoppered and allowed to stand at room temperature for 21 hours. Evaporation of the solution under reduced pressure gave 37.0 g. (95%) of methyl isonicotinate methobromide. Recrystallization of a small sample of the salt from chloroform gave pure methyl isonicotinate methobromide, M.P. 163–165° C.

A solution of 10.0 g. of methyl isonicotinate methobromide in 100 ml. of methanol was shaken with 0.2 g. of platinum oxide under 2–3 atm. of hydrogen. After the pressure of hydrogen remained constant during a period of 1 hour, the solution was filtered, and the solvent was removed from the filtrate by evaporation under reduced pressure. The residual solid, after recrystallization from methanol-ether, gave 8.9 g. (90%) of methyl 1-methylisonipecotate hydrobromide, M.P. 137–138° C.

A solution of 10.0 g. of methyl 1-methylisonipecotate hydrobromide in 20 ml. of water was basified with a saturated sodium carbonate solution and extracted with ether. The ether extract was dried over sodium carbonate, filtered, and evaporated. Distillation of the oily residue under reduced pressure gave 4.9 g. (83%) of methyl 1-methylisonipecotate, B.P. 98–100° C. at 20 mm., $n_D^{29}$ 1.4515.

EXAMPLE 2

Methyl 1-Methyl Isonipecotate (Procedure B)

Freshly distilled methyl isonicotinate (70.0 g.) was dissolved in a solution of 56 ml. of glacial acetic acid and 83 ml. of water. Water was added to bring the volume to 250 ml. and 1.25 g. of platinum oxide was introduced. The mixture was hydrogenated at 1200 p.s.i. at room temperature until no further hydrogen was absorbed. The catalyst was removed by filtration and 50 ml. of 36% formalin and 5 g. of 10% palladium-on-charcoal were added. Hydrogenation was continued at 1200 p.s.i. until no further absorption of hydrogen occurred. The catalyst was removed by filtration, and the clear filtrate, chilled at 10°, was basified with a 35% sodium hydroxide solution. The strongly basic solution was saturated with anhydrous potassium carbonate and extracted with ether. The ether extract was dried over anhydrous sodium sulphate, and after evaporation of the ether, a clear colorless oil remained. Distillation of this oil at reduced pressure gave 70.2 g. (88%) of methyl 1-methyl isonipecotate, B.P. 70–74° at 5 mm. The picrate melted at 146–147°.

Methyl 1-methylisonipecotate (69.6 g. (0.48 mole)) was mixed with 350 ml. of 1:1 hydrochloric acid solution. The mixture was evaporated to dryness on a water bath under reduced pressure, and 79.0 g. (99.5%) of 1-methyl isonipecotic acid hydrochloride as a white powdery solid, M.P. 225–227°, lit. (24) M.P. 223–225°, remained.

EXAMPLE 3

1-Methyl-4-Piperidyl Phenyl Ketone

To 79.0 g. of 1-methyl isonipecotic acid hydrochloride in a three-necked apparatus was added dropwise 280 ml. of thionyl chloride, and the mixture was heated under reflux for 2 hours. The clear yellow solution was concentrated under reduced pressure until most of the excess thionyl chloride was removed. Anhydrous benzene (350 ml.) was added, the mixture was cooled in an ice-water bath, and 175 g. of aluminum chloride were added with stirring over a period of 1–1.5 hours. The reaction mixture was heated under reflux for 10 hours and then was poured into a mixture of 200 g. of ice and 175 ml. of concentrated hydrochloric acid. The benzene was removed by steam-distillation, the residue was extracted with ether, and the ether extract was discarded. The aqueous layer was made strongly basic with sodium hydroxide and was extracted with ether. The ether extracts were dried over sodium sulphate and filtered, and the ether was removed by evaporation. The oily residue which remained was distilled under reduced pressure to give 79.9 g. (89.3%) of 1-methyl-4-piperidyl phenyl ketone, B.P. 148–152° C. at 5 mm., $n_D^{20}$ 1.5592.

EXAMPLE 4

1-Methyl-4-Piperidyl p-Tolyl Ketone

Using the Friedel-Crafts procedure described above, 20.0 g. of methyl 1-methylisonipecotate was converted to 22.2 g. (82%) of impure 1-methyl-4-piperidyl p-tolyl ketone. A small sample of the crude was recrystallized from methanol-water to give pure 1-methyl-4-piperidyl p-tolyl ketone, M.P. 85–86.5° C.

EXAMPLE 5

1-Methyl-4-Piperidyl Phenyl Ketone by the Oxidation Procedure

A mixture of 250 g. of 4-benzoyl pyridine and 177 g. of methyl bromide in 500 ml. of methanol in a suction flask was stoppered and allowed to stand at room temperature for several days. After concentration of the methanol solution under reduced pressure, the addition of ethyl acetate gave 310.6 g. (87%) of 4-benzoyl pyridine methobromide, M.P. 162–167° C.

A solution of 95.4 g. of (0.32 mole) of 4-benzoyl pyridine methobromide in 200 ml. of methanol was treated with hydrogen at 600 p.s.i. in the presence of 1.0 g. of platinum oxide. After the pressure of hydrogen remained constant during a period of 1 hour, the solution was filtered and the filtrate concentrated on a steam bath. The oily residue was dissolved in water and basified with sodium hydroxide to give 66.0 g. (98%) of 1-methyl-4-piperidyl phenyl carbinol, M.P. 153–156° C.

EXAMPLE 6

1 Benzyl-4-Benzoylpyridinium Chloride

A solution of 18.3 g. of 4-benzoylpyridine and 12.6 g. of benzyl chloride in 200 ml. of methanol was heated under reflux for 12 hours. The solution was concentrated on the steam bath and on standing crystallized to give 24.6 g. (82%) of 1-benzyl-4-benzoylpyridinium chloride, M.P. 186–188° C.

EXAMPLE 7

1-β-Phenethyl-3-Benzoylpyridinium Bromide

In the manner described in Example 6, 18.3 g. of 3-benzoylpyridine and 20 g. of β-phenethyl bromide gave 33 g. of 1-β-phenethyl-3-benzoylpyridinium bromide, M.P. 147–149° C.

EXAMPLE 8

1-Methyl-3-Benzoylpyridinium Bromide

A mixture of 182.2 g. of 3-benzoylpyridine and 100 g. of methyl bromide in 350 ml. of isopropyl alcohol was allowed to stand at room temperature for 24 hours in a tightly stoppered flask. The precipitated solid was collected by filtration and washed with ether to give 271 g. (96%) 1-methyl-3-benzoylpyridinium bromide, M.P. 146–148° C.

EXAMPLE 9

1-Benzyl-4-Piperidylphenylcarbinol Hydrochloride

A solution of 15 g. of 1-benzyl-4-benzoylpyridinium chloride in 200 ml. of methanol was shaken with 0.3 g. of platinum oxide at an initial hydrogen pressure of 50 p.s.i. After the absorption of hydrogen ceased, the filtrate was concentrated under reduced pressure. Addition of anhydrous ether caused the precipitation of a white, crystalline solid which was recrystallized from isopropyl alcohol to give 14.8 g. (90%) of 1-benzyl-4-piperidylphenylcarbinol hydrochloride, M.P. 184–185° C.

Neutralization of an aqueous solution gave a quantitative yield of 1-benzyl-4-piperidylphenylcarbinol, M.P. 114–115.5° C.

EXAMPLE 10

4-Piperidylphenylcarbinol

Similarly, the reduction of 10 g. of 4-benzoylpyridine hydrochloride, M.P. 194–197° C. gave 9.1 g. (86%) of 4-piperidylphenylcarbinol hydrochloride, M.P. 190–193°. An aqueous solution of the hydrochloride which was basified by the addition of solid sodium hydroxide quantitatively furnished 4-piperidylphenylcarbinol, M.P. 162–164° C.

EXAMPLE 11

Catalytic Hydrogenation of 1-Methyl-3-Benzoylpyridinium Bromide

A solution of 54 g. (0.2 mole) of 1-methyl-3-benzoylpyridinium bromide in 300 ml. of methanol was shaken with 0.6 g. of platinum oxide at an initial hydrogen pressure of 50 p.s.i. After the absorption of hydrogen ceased, about 24 hours, the catalyst was removed from the solution by filtration, and the filtrate was evaporated to dryness under reduced pressure. The residual solid was dissolved in water, and the resulting solution basified by the addition of solid sodium hydroxide and extracted with ether. The ether extract was dried over anhydrous sodium sulfate, and after evaporation of the ether, a yellow oil remained. Distillation of this oil gave 27 g. of 1-methyl-3-piperidylphenylcarbinol, B.P. 146–152° C./4 mm. This material was oxidized directly without further purification.

EXAMPLE 12

1-Methyl-3-Benzoylpiperidine Hydrobromide

To 25 g. of the oil from Example 11 dissolved in 200 ml. of glacial acetic acid was added a solution of 9 g. of chromium trioxide in 100 ml. of 80% acetic acid. The resulting solution was heated on the steam bath for 1 hour, and then the solvent was removed by distillation under diminished pressure. The residue was dissolved in 400 ml. of chloroform, and this solution was saturated with anhydrous hydrogen bromide. After removal of the chloroform, the residue was recrystallized twice from isopropyl alcohol to give 22.6 g. (39.6% overall) of 1-methyl-3-benzoylpiperidine hydrobromide, M.P. 128–131° C.

EXAMPLE 13

1-Benzyl-4-Benzoylpiperidine Hydrobromide

The oxidation of 17 g. of 1-benzyl-4-piperidylphenylcarbinol by 4.1 g. of chromium trioxide was accomplished in glacial acetic acid in the manner previously described. The reaction proceeded to give 15 g. (68.7%) of 1-benzyl-4-benzoylpiperidine hydrobromide, M.P. 237–238° C.

EXAMPLE 14

1-Methyl-4-Bromo-4-piperidyl Phenyl Ketone Hydrobromide

Hydrogen bromide was bubbled through 34.7 g. of 1-methyl-4-piperidyl phenyl ketone in 300 ml. of ether until precipitation ceased. The precipitate was collected by filtration to give 47.5 g. (97.5%) of the hydrobromide.

The hydrobromide (25 g.) was dissolved in 90 ml. of chloroform in a 250 ml. suction flask, and 12 ml. of bromine was added. The mixture was loosely stoppered and allowed to stand for 12 hours. The mixture was then evaporated to dryness under reduced pressure giving 50.5 g. of orange perbromide. The perbromide was treated with 100 ml. of methanol, and solution was completed on addition of a small amount (6.5 g.) of phenol. Dry ether then was added to precipitate the 28.0 g. (93%) of the perbromide-free product. Recrystallization of the solid from methanol-ether gave an analytical sample of the product, M.P. 155–156° C. dec.

EXAMPLE 15

1 Methyl-4-Bromo-4-Piperidyl p-Tolyl Ketone

Using the procedure of Example 14, 22.2 g. of 1-methyl-4-piperidyl p-tolyl ketone gave a quantitative yield of the 4-bromo hydrobromide, M.P. 217.5–219.5° C. (after recrystallization from isopropyl alcohol).

EXAMPLE 16

1-Methyl-4-Chloro-4-Piperidyl Phenyl Ketone Hydrochloride 1-methyl-4-piperidyl phenyl ketone hydrochloride was prepared in quantitative yield from the base by precipitation from a solution of hydrogen chloride in ether. The hydrochloride, after recrystallization from methanol-chloroform melted at 201–205° C.

A chloroform solution of 6.4 g. of 1-methyl-4-piperidyl phenyl ketone hydrochloride was saturated with chlorine and allowed to stand for 12 hours. The solvent was removed under reduced pressure, and the residue was dissolved in methanol and treated with phenol. After filtration, the solution was diluted with anhydrous ether to give 5.3 g. (73%) of 1-methyl-4-chloro-4-piperidyl phenyl ketone hydrochloride, M.P. 179–180° C. dec., as a precipitate.

EXAMPLE 17

1-Benzyl-4-Benzoyl-4-Bromopiperidine Hydrobromide

To a solution of 12 g. of 1-benzyl-4-benzoylpiperidine hydrobromide in 200 ml. of chloroform was added 4 ml. of bromine. The resulting solution stood at room temperature for 24 hours, and then the solvent was evaporated under reduced pressure. The residue was dissolved in methanol and treated with phenol to destroy any excess bromine or perbromide. The addition of ether to the alcoholic solution caused the precipitation of a white solid which was collected by filtration and recrystallized from isopropyl alcohol to give 13 g. (88%) of 1-benzyl-4-benzoyl-4-bromopiperidine hydrobromide, M.P. 162–164° C.

EXAMPLE 18

1-Methyl-3-Benzoyl-3-Bromopiperidine Hydrobromide

A solution of 15.1 g. of 1-methyl-3-benzoylpiperidine in 150 ml. of chloroform was treated with 8 ml. of bromine and was allowed to stand overnight at room temperature. Isolation of the product in the manner described in Example 17 gave 15.3 g. (56.2%) of 1-methyl-3-benzoyl-3-bromopiperidine hydrobromide, M.P. 142–144° C.

EXAMPLE 19

Reaction of 1-Methyl-4-Bromo-4-Piperidyl Phenyl Ketone Hydrobromide With Sodium Methoxide (and Sodium Hydroxide) in Absolute Methanol A. *With sodium methoxide.*—A mixture of 500 ml. of commercial grade methanol and 6.3 g. of calcium hydride was heated under reflux for 7.5 hours. After this time approximately 75 ml. of methanol was removed by distillation and discarded, and 150 ml. of the anhydrous methanol was transferred by distillation into a conventional three-necked flask. The 3-necked flask and its related parts had been preheated in an oven to remove adsorbed water. A sample (50 ml.) of the distilled methanol was removed from the flask by a pipette and was added to 3.6 g. of 1-methyl-4-bromo-4-piperidyl phenyl ketone hydrobromide in a dropping funnel. Sodium (3.2 g. weighed under benzene) was added to the dry methanol in the flask. The hydrobromide in methanol was then added dropwise over a period of 1 hour to the boiling alcoholic sodium methoxide solution. The mixture was heated under reflux for an additional 5 hours and allowed to stand overnight. The solution was then transferred to a suction flask and evaporated to dryness. The residue then was triturated with several portions of ether (totaling 150 ml.), and the ether solution was evaporated on the steam bath to give 1.9 g. (83%) of crude 6-methyl-2-methoxy-2-phenyl-1-ox-6-azaspiro(2.5)octane. Distillation of this material gave 1.05 g. (52%) of pure epoxyether, B.P. 150–151° C. at 10 mm., $n_D^{26.5}$ 1.5170.

B. *With sodium hydroxide.*—Following the procedure outlined above, but using 5.0 g. of sodium hydroxide (oven-dried) instead of the sodium methoxide gave an 86.5% yield of the epoxyether, B.P. 145–146° C. at 8 mm. $n_D^{27.5}$ 1.5165.

EXAMPLE 20

*Reaction of 1-Methyl-4-Chloro-4-Piperidyl Phenyl Ketone Hydrochloride With Sodium Methoxide in Methanol*

To 100 ml. of methanol in a conventional three necked apparatus was added 4.0 g. of sodium. The solution was heated to boiling and 2.8 g. of 1-methyl-4-chloro-4-piperidyl phenyl ketone hydrochloride in 30 ml. of methanol was added dropwise over a period of one hour. The mixture then was heated under reflux for an additional hour and allowed to stand overnight. The reaction mixture then was poured into 30 ml. of water, and the methanol was removed by distillation under reduced pressure. The residual oil was taken up in ether, dried over sodium carbonate, and filtered, and the ether was removed by evaporation on a steam bath. Distillation of the residual oil gave 2.0 g. (84%) of 6-methyl-2-methoxy-2-phenyl-1-ox-6-azaspiro(2.5)octane, B.P. 170–175° C. at 25 mm., $n_D^{30}$ 1.5158.

EXAMPLE 21

*6 - Methyl - 2 - Methoxy - 2 - Phenyl - 1 - Ox-6-Azaspiro (2.5)Octane*

To 100 ml. of commercial grade methanol in the conventional three-necked reaction set-up was added 6.0 g. (0.26 gram-atom) of sodium. After all the sodium had dissolved, the solution was heated to boiling, and 9.3 g. (0.025 mole) of 1-methyl-4-bromo-4-piperidyl phenyl ketone hydrobromide in 60 ml. of methanol was added dropwise over a period of 4.75 hours. After heating for an additional 0.75 hour the mixture was poured into 100 ml. of water in a suction flask, and the methanol was removed by distillation under reduced pressure by heating on a steam bath. The aqueous solution was then extracted with portions of ether (totaling 300 ml.), and the ether extract was dried over sodium carbonate. Filtration of the extracts, removal of the ether by distillation, and distillation of the residual oil under reduced pressure gave 5.2 g. (87%) of 6-methyl-2-methoxy-2-phenyl-1-ox-6-azaspiro(2.5)octane.

EXAMPLE 22

*6-Methyl-2-Ethoxy-2-Phenyl-1-Ox-6-Azaspiro(2.5)Octane*

Using the procedure outline above, but using sodium ethoxide in ethanol instead of the sodium methoxide in methanol gave an 82% yield of 6-ethyl-2-ethoxy-2-phenyl-1-ox-6-azaspiro(2.5)octane, B.P. 160–165° C. at 15 mm., $n_D^{19}$ 1.5100.

EXAMPLE 23

*6-Methyl-2-Methoxy-2-(Para-tolyl)-1-Ox-6-Azaspiro (2.5)Octane*

Using the procedure outlined above, 19.65 g. of 1-methyl-4-bromo-4-piperidyl para-tolyl ketone hydrobromide was converted by reaction with sodium methoxide in methanol to 9.0 g. (87%) of 6-methyl-2-methoxy-2-(para-tolyl)-1-ox-6-azaspiro(2.5)octane, B.P. 135–140° C. at 3 mm.

EXAMPLE 24

*Reaction of 1-Benzyl-4-Benzoyl-4-Bromopiperidine Hydrobromide*

*With sodium methoxide in methanol.*—To a solution of 13.5 g. of sodium methoxide in 150 ml. of methanol was added 11 g. of the product of Example 17 dissolved in 350 ml. of hot methanol. The stirred mixture was heated under reflux for 4 hours, and the solvent was partially removed by distillation. The residue was dissolved in water, and this solution was extracted with three 75 ml. portions of ether. After drying the ether extracts over anhydrous calcium sulfate, the solvent was removed by evaporation, and the residue was distilled under pressure to give 3.5 g. (45%) of 6-benzyl-2-methoxy-2-phenyl-1-ox-6-azaspiro(2.5)octane, B.P. 170–175° C./2 mm., $n_D^{26}$ 1.5560.

EXAMPLE 25

*Reaction of 1-Methyl-3-Benzoyl-3-Bromopiperidine Hydrobromide*

*With sodium methoxide in methanol.*—A solution of 20.5 g. of the compound of Example 18 was added to a hot solution of 13.5 g. of sodium methoxide in 150 ml. of methanol. This mixture was heated under reflux with mechanical stirring for 6 hours, and the solvent was partially removed by distillation. To the residue was added 200 ml. of water, and the resulting solution was extracted with three 100 ml. portions of ether. After drying the ether over anhydrous calcium sulfate, the solvent was removed by evaporation, and the residue was distilled at reduced pressure to give 4.2 g. (33%) of 2-methoxy-5-methyl-2-phenyl-1-ox-5-azaspiro(2.5)octane, B.P. 117–119° C./2 mm.

EXAMPLE 26

*Reaction of 6-Methyl-2-Methoxy-2-Phenyl-1-Ox-6-Azaspiro(2.5)Octane With Propionic Acid*

To 2.8 g. of the epoxyether in 50 ml. of ether was added 2.5 g. of freshly distilled propionic acid in 20 ml. of ether; the solution was stoppered and allowed to stand for 6 hours. The ether was removed by distillation on a steam bath, and the oily residue was dissolved in 30 ml. of water. The aqueous solution was made basic with sodium carbonate, and the liquid which separated was extracted with ether and dried over sodium carbonate. Filtration of the extract followed by the addition of dry hydrogen chloride to the ether solution gave 3.5 g. (99% yield from the epoxyether of 1-methyl-4-propionoxy-4-piperidyl phenyl ketone hydrochloride. Recrystallization from chloroform-methanol-ether gave 3.0 g. (85%) of the hydrochloride, M.P. 254–255° C. dec.

EXAMPLE 27

*Reaction of 6-Methyl-2-Methoxy-2-Phenyl-1-ox-6-Azaspiro(2.5)Octane With Benzoic Acid*

To 2.15 g. of the epoxyether in 40 ml. of ether was added 2.5 g. of benzoic acid in 40 ml. of ether. The solution was stoppered and allowed to stand for 12 hours. The ether was removed by distillation, and the residual solid was dissolved in methanol. Water was added, and the 1-methyl-4-benzoyloxy-4-piperidyl phenyl ketone was precipitated by the addition of sodium carbonate and more water to give 2.8 g. (92%). The addition of hydrogen chloride gas to 2.65 g. of the ketone in an ether solution yielded 2.7 g. (90%) of the hydrochloride of 1-methyl-4-benzoyloxy-4-piperidyl phenyl ketone. After two recrystallizations from methanol-ether and drying under reduced pressure, 2.3 g. of the hydrochloride of 1-methyl-4-benzoyloxy-4-piperidyl phenyl ketone was obtained which melted at 265–258° C. dec.

EXAMPLE 28

*Reaction of 6-Methyl-2-Methoxy-2-Phenyl-1-ox-6-Azaspiro(2.5)Octane With Diphenylacetic Acid*

To 4.0 g. of diphenylacetic acid in 100 ml. of ether was added 2.2 g. of the epoxyether in 50 ml. of ether. The mixture was allowed to stand for 3 hours, and during this time a precipitate formed. The solution then was decanted and the ether supernatant was concentrated on a steam bath leaving a solid residue. This solid residue was combined with the main precipitate, and the solid was dissolved in hot methanol. Addition of a saturated solution of sodium carbonate caused 1.65 g. of a solid, M.P. 120–123° C., to precipitate. The solid was recrystallized from chloroform (soluble)-ether (slightly soluble) to give 1.3 g. (34.9%) of 1-methyl-4-diphenylacetoyloxy-4-piperidyl phenyl ketone, M.P. 122–124° C.

The 1.3 g. of the ketone was dissolved in ether diluted with a small amount of acetone and was precipitated as the hydrochloride by the usual method. The yield was 1.35 g. of the hydrochloride, M.P. 235–248° C. This was recrystallized from chloroform-ether to give 1.3 g. of the hydrochloride, M.P. 243–245° C. A third recrystallization from ethyl acetate-methanol gave 1.1 g. of the hydrochloride, M.P. 246–248° C.

EXAMPLE 29

*Reaction of 6-Methyl-2-Methoxy-2-Phenyl-1-ox-6-Azaspiro(2.5)Octane With Hippuric Acid*

To 2.5 g. of hippuric acid dissolved in 150 ml. of an ether-methanol mixture was added 2.0 g. of the epoxyether. The mixture was stoppered and allowed to stand overnight. The solvents then were removed by distillation on a steam bath, and the residue was dissolved in water. An oil formed on the addition of sodium carbonate, consequently dilute hydrochloric acid was added in order to bring the oil back into solution so that a solid might be obtained by the slow neutralization with sodium carbonate. However, the readdition of sodium carbonate again caused the oil to separate. The oil was then taken up in ether and the aqueous layer was extracted with ether. The combined ether solutions were dried over sodium carbonate. Filtration and evaporation of the ether gave 2.2 g. (58%) of 1-methyl-4-hippuroyloxy-4-piperidyl phenyl ketone, M.P. 104–111° C. The 2.2 g. of the ketone was dissolved in acetone, and hydrogen chloride gas was added giving 2.2 g. of the hydrochloride. Recrystallization of the hydrochloride from acetone-methanol mixture gave 1.7 g. of hydrochloride, M.P. 170° C. dec.

EXAMPLE 30

*Reaction of 6-Methyl-2-Methoxy-2-Phenyl-1-ox-6-Azaspiro(2.5)Octane With p-Nitrobenzoic Acid*

To a filtered solution of 4.5 g. of p-nitrobenzoic acid in 350 ml. of ether was added dropwise over a period of 4 hours 3.0 g. of the epoxyether in 50 ml. of ether with stirring by a magnetic stirrer. The mixture was permitted to stand overnight. A solution of 5.0 g. of sodium carbonate in 65 ml. of water then was added, and the mixture was stirred until two clear liquid phases formed. The ether layer then was separated and concentrated to give 4.6 g. (95.5%) of 1-methyl-4-(p-nitro benzoyloxy)4-piperidyl phenyl ketone, M.P. 164–168° C.

EXAMPLE 31

*Reaction of 6-Methyl-2-Methoxy-2-Phenyl-1-ox-6-Azaspiro(2.5)Octane With p-Aminobenzoic Acid*

To 3.5 g. of p-aminobenzoic acid in 25 ml. of pyridine was added 3.0 g. of the epoxyether in 50 ml. of ether. The mixture was allowed to stand overnight. The solution was concentrated under reduced pressure, and water was added to dissolve the residue. The addition of sodium carbonate produced an oil which crystallized when seeded with base obtained from a smaller preliminary run to give 4.3 g. (97.0%) of 1-methyl-4-(p-aminobenzoyloxy)-4-piperidyl phenyl ketone, M.P. 179–180° C.

EXAMPLE 32

*Reaction of 6-Methyl-2-Methoxy-2-Phenyl-1-ox-6-Azaspiro(2.5)Octane With Isonicotinic Acid*

A solution of 3.15 g. of the epoxyether in 20 ml. of ether was added to 3.5 g. of isonicotinic acid dissolved in 50 ml. of hot pyridine. After standing overnight, the mixture was concentrated under reduced pressure and water was added to the oily residue. The addition of sodium carbonate produced an oil which crystallized when seeded with base obtained from a smaller preliminary run to give 4.1 g. (94.5%) of 1-methyl-4-isonicotinoyloxy-4-piperidyl phenyl ketone, M.P. 126–128° C.

EXAMPLE 33

*Reaction of 6-Methyl-2-Methoxy-2-(p-tolyl)-1-ox-6-Azaspiro(2.5)Octane With Propionic Acid*

A solution of 3.0 g. of the epoxyether in 50 ml. of ether was added dropwise to 4.0 g. of propionic acid in 50 ml. of ether. After completion of the addition, the mixture was allowed to stand overnight. The ether solution then was concentrated, the residue was dissolved in water, and the solution was basified with sodium carbonate to give solid 1-methyl-4-propionoyloxy-4-piperidyl p-tolyl ketone. Recrystallization of the solid from ether-petroleum ether gave 3.2 g. (89.8%).

The 3.2 g. of the base was converted to the hydrochloride by the conventional method in ether to give, after recrystallization from acetone, 2.7 g. of the hydrochloride, M.P. 231–239° C.

EXAMPLE 34

*Reaction of 6-Methyl-2-Methoxy-2-(p-tolyl)-1-ox-6-Azaspiro(2.5)Octane With Benzoic Acid*

A solution of 2.7 g. of the epoxyether in 50 ml. of ether was added dropwise to 4.0 g. of benzoic acid in 75 ml. of ether. After completion of the addition, the mixture was allowed to stand overnight. The ether solution then was concentrated, the residue was dissolved in water and the solution was basified with sodium carbonate to give the solid 1-methyl-4-benzoyloxy-4-piperidyl p-tolyl ketone. Recrystallization of the base from ether-petroleum ether gave 3.0 g. (71.6%).

The 3.0 g. of base was converted to the hydrochloride. Recrystallization from acetone gave 2.8 g. of the hydrochloride, M.P. 255–256° C.

EXAMPLE 35

*Reactions of 6-Benzyl-2-Methoxy-2-Phenyl-1-ox-6-Azaspiro(2.5)Octane*

(a) *With acetic acid.*—A solution of 3 g. of the epoxyether in 100 ml. of absolute ether was added to 100 ml. of absolute ether containing 2 ml. of acetic acid. The resulting solution was allowed to stand overnight at room temperature, was washed with a saturated sodium carbonate solution, and was dried over anhydrous calcium sulfate. The solvent was removed by evaporation, and the residue was recrystallized from ether to give 2 g. (60%) of 1-benzyl-4-benzoyl-4-piperidyl acetate, M.P. 91–93° C.

An etheral solution of the base was saturated with anhydrous hydrogen chloride, and the precipitated solid was collected by filtration and recrystallized from chloroform-ether to give 1.3 g. (39%) of hydrochloride, M.P. 265–267° C.

(b) *With propionic acid.*—The reaction of 3 g. of the epoxyether with 2 ml. of propionic acid was carried out as in (a), but no solid was obtained on treatment of the reaction mixture with ether. The ethereal solution therefore was directly saturated with hydrogen chloride, and the precipitated solid was collected by filtration and recrystallized from isopropyl alcohol to give 0.8 g. (20%) of 1-benzyl-4-benzoyl-4-piperidyl propionate hydrochloride, M.P. 230–233° C.

(c) *With benzoic acid.*—The reaction of 3 g. of the epoxyether with 3 g. of benzoic acid was carried out as described in (a) and gave 2.5 g. (61.7%) of 1-benzyl-4-benzoyl-4-piperidyl benzoate, M.P. 121–123° C. Conversion to the hydrochloride by the usual method gave, after recrystallization from isopropyl alcohol, 1.2 g. (27.2%) of hydrochloride, M.P. 220–222° C.

(d) *With p-aminobenzoic acid.*—3 g. of the epoxyether was dissolved in 50 ml. of anhydrous ether, and the solution was added to 100 ml. of pyridine in which 3.6 g. of p-aminobenzoic acid had been dissolved. This solution stood overnight at room temperature, and then the solvents were removed by evaporation under reduced pressure. The residue was washed with three 100 ml. portions of a saturated sodium carbonate solution and then was dissolved in 150 ml. of ether. The ethereal solution was washed with water and dried over anhydrous calcium sulfate. After drying, the solvent was removed by evaporation, and the residue was recrystallized from petroleum ether to give 3 g. (72.3%) of 1-benzyl-4-benzoyl-4-piperidyl p-aminobenzoate, M.P. 173–174° C.

EXAMPLE 36

*Reactions of 2-Methoxy-5-Methyl-2-Phenyl-1-ox-5-Azaspiro(2.5)Octane*

(a) *With acetic acid.*—A solution of 2.5 g. of the epoxyether in 50 ml. of anhydrous ether was added to 50 ml. of ether containing 3 ml. of glacial acetic acid, and the resulting solution was allowed to stand at room temperature for 12 hours. The ethereal solution then was washed with a saturated solution of sodium carbonate and dried over anhydrous calcium sulfate. The solvent was removed by evaporation, and the residue was recrystallized from petroleum ether to give 2.1 g. (81%) of 1-methyl-3-benzoyl-3-piperidyl acetate, M.P. 88–89° C.

An ethereal solution of 2.5 g. of the base was saturated with anhydrous hydrogen chloride, and the solid which precipitated was collected by filtration and recrystallized from isopropyl alcohol to give 2.0 g. (70.5%) of hydrochloride, M.P. 248–250° C.

(b) *With benzoic acid.*—The reaction of 4.35 g. of the epoxyether with 5 g. of benzoic acid in the manner described in (a) gave, after recrystallization from ligroin, 4.1 g. (66%) of 1-methyl-3-benzoyl-3-piperidyl benzoate, M.P. 114–115° C.

The hydrochloric was prepared in the usual manner and melted 201–202° C.

(c) *With m-hydroxybenzoic acid.*—A 4.35 g. sample of the epoxyether in 50 ml. of anhydrous ether was added to 5.5 g. of my-hydroxybenzoic acid in 100 ml. of anhydrous ether, and, after a period of 12 hours, the reaction product was isolated as described in (a). The crude material was recrystallized from 400 ml. of methanol to give 3.2 g. (51%) of 1-methyl-3-benzoyl-3-piperidyl m-hydroxybenzoate, M.P. 214–216° C.

A solution of 2 g. of the base was dissolved in 400 ml. of boiling methanol and to this solution was added 1.5 g. of maleic acid. After cooling, the solution was concentrated, and solid separated on standing to give 2.1 g. (78.5%) of the maleic acid salt, M.P. 208–209° C.

(d) *With o-hydroxybenzoic acid.*—A 4.25 g. sample of the epoxyether was treated with 5.5 g. of o-hydroxybenzoic acid in 100 ml. of ether, and, after standing overnight, the reaction mixture was treated as described in (a). The impure material thus obtained was recrystallized from ligroin to give 2.0 g. (34%) of 1-methyl-3-benzoyl-3-piperidyl o-hydroxybenzoate, M.P. 128–130° C.

An ethereal solution of the base was saturated with anhydrous hydrogen chloride, and the precipitated solid was collected by filtration and recrystallized from isopropyl alcohol to give 2 g. of hydrochloride, M.P. 196–200° C.

(e) *With p-hydroxybenzoic acid.*—A 4.25 g. sample of the epoxyether was allowed to react with 5.5 g. of p-hydroxybenzoic acid in 100 ml. of ether, and the reaction mixture was treated as described in (a). The crude ester was then recrystallized from aqueous alcohol to give 1.9 g. (33%) of 1-methyl-3-benzoyl-3-piperidyl p-hydroxybenzoate, M.P. 212–214° C.

An ethanolic solution of the base was saturated with anhydrous hydrogen chloride, and the solvent was removed by evaporation under reduced pressure. Addition of ether to the residue gave 1.7 g. (80%) of 1-methyl-3-benzoyl-3-piperidyl p-hydroxybenzoate hydrochloride, M.P. 188–189° C.

(f) *With furanoic acid.*—A 4.25 g. sample of the epoxyether was treated with 5 g. of 2-furanoic acid in the manner described previously, and gave, after recrystallization from ligroin, 3 g. (50.5%) of 1-methyl-3-benzoyl-3-piperidyl 2-furanoate, M.P. 127–128° C.

An ethereal solution of 3.4 g. of the base gave 3.5 g. of 1-methyl-3-benzoyl-3-piperidyl furanoate hydrochloride, M.P. 210–212° C.

EXAMPLE 37

*Reactions of 2-Methoxy-5-Methyl-2-Phenyl-1-ox-5-Azaspiro(2.5)Octane with Hydrochloric Acid*

A sample of 4.35 g. (0.019 mole) of the epoxy ether was treated with 100 ml. of dilute hydrochloric acid, and the resulting solution was allowed to stand at room temperature for 12 hours and then was basified by the addition of sodium hydroxide. The mixture was extracted with ether, and the ether extract was dried over anhydrous calcium sulfate. After removal of the solvent by evaporation, a brown semi-solid remained, and this material was recrystallized from ligroin to give 2 g. (48%) of 1-methyl-3-benzoyl-3-hydroxy-piperidine, M.P. 52–54° C.

An ethereal solution of the base was saturated with anhydrous hydrogen chloride to give the hydrochloride, M.P. 161–164° C.

EXAMPLE 38

*1-Benzyl-4-Benzoyl-4-Hydroxypiperidine*

A 3 g. (0.01 mole) sample of 6-benzyl-2-methoxy-2-phenyl-1-ox-6-azaspiro(2.5)octane was treated with 100 ml. of dilute hydrochloric acid, and the resulting mixture was warmed on the steam bath for 30 minutes. On cooling the solution, a pink solid precipitated, was collected by filtration, and was recrystallized from water to give 2.5 g. (78%) of 1-benzyl-4-benzoyl-4-hydroxypiperidine hydrochloride, M.P. 190–191.5° C.

An aqueous solution of the hydrochloride was basified by the addition of sodium hydroxide to give a quantitative yield of 1-benzyl-4-benzoyl-4-hydroxypiperidine, M.P. 68–70° C.

EXAMPLE 39

*Reaction of 6-Methyl-2-Methoxy-2-Phenyl-1-ox-6-Azaspiro(2.5)Octane With Dilute Hydrochloric Acid*

To 2.9 g. of the epoxyether in 30 ml. of water was added 5 ml. of concentrated hydrochloric acid. The mixture was stirred, and the 1-methyl-4-hydroxy-4-piperidyl phenyl ketone was isolated by the addition of sodium carbonate. The yield, 2.7 g., was quantitative. After drying, the 1-methyl-4-hydroxy-4-piperidyl phenyl ketone was dissolved in ether, filtered, and precipitated as the hydrochloride to give 2.9 g. of 1-methyl-4-hydroxy-4-piperidyl phenyl ketone hydrochloride. Two recrystallizations from methanol, chloroform-ether gave 2.45 g. of pure 1-methyl-4-hydroxy-4-piperidyl phenyl ketone hydrochloride, M.P. 171.5–172.5° C.

EXAMPLE 40

*Reaction of 6-Methyl-2-Methoxy-2-(p-Tolyl)-1-ox-6-Azaspiro(2.5)Octane With Dilute Hydrochloric Acid*

The addition of 3.2 g. of the epoxyether to a dilute hydrochloric acid solution gave 3.9 g. of crude 1-methyl-4-hydroxy-4-piperidyl p-tolyl ketone after neutralization with sodium carbonate. The crude solid was recrystallized from ethyl acetate to give 2.4 g. of pure 1-methyl-4-hydroxy-4-piperidyl p-tolyl ketone, M.P. 156–158° C.

The 2.4 g. of the base was converted to 2.6 g. of the hydrochloride by addition of dry hydrogen chloride to an ether-methanol solution of the base. Recrystallization of the hydrochloride from acetone gave 2.5 g. of pure 1-methyl-4-hydroxy-4-piperidyl p-tolyl ketone hydrochloride, M.P. 223–225° C.

We claim:
1. A method of making compounds selected from the group consisting of

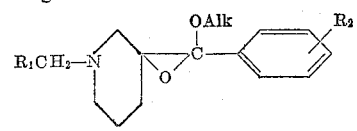

and

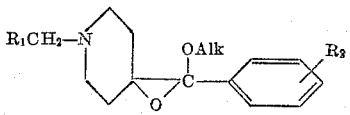

wherein R₁ is selected from the group consisting of hydrogen, lower alkyl and phenyl, R₂ is selected from the group consisting of hydrogen and lower alkyl, and Alk represents lower alkyl which comprises heating a compound selected from the group consisting of

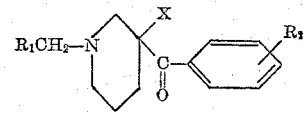

and

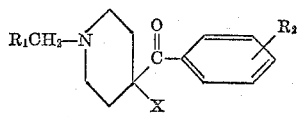

wherein X is a halogen of atomic number not less than 17 and not more than 35, with an alkali metal lower alkoxide in a lower alkanolic medium.

2. A method of making a 2-lower alkoxy-6-lower alkyl - 2 - monocyclic aryl- 1 -oxa-6-azaspiro(2,5)octane which comprises heating a 1-lower alkyl-4-bromo-4-piperidyl monocyclic aryl ketone with a sodium lower alkoxide in a lower alkanolic medium.

3. Compounds selected from the group consisting of

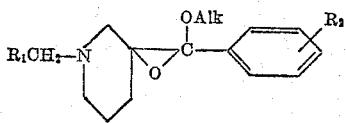

and

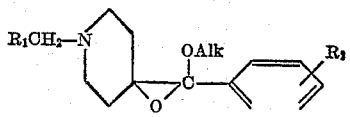

wherein R₁ is selected from the group consisting of hydrogen, lower alkyl and phenyl, R₂ is selected from the group consisting of hydrogen and lower alkyl, and Alk represents lower alkyl.

4. 2-lower alkoxy-6-lower alkyl-2-monocyclicaryl hydrocarbon-1-oxa-6-azaspiro(2,5)octane.

5. 2-methoxy - 6 - methyl-2-phenyl - 1 - oxa-6-azaspiro (2,5)octane.

6. 2-lower alkoxy-5-lower alkyl-2-monocyclicaryl hydrocarbon-1-oxa-5-azaspiro(2,5)octane.

7. 2-methoxy - 5 - methyl - 2 - phenyl-1-oxa-5-azaspiro (2,5)octane.

8. A method of making compounds selected from the group consisting of

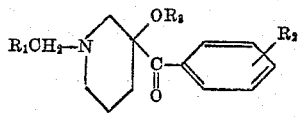

and

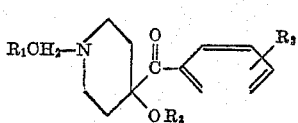

wherein R₁ is selected from the group consisting of hydrogen, lower alkyl and phenyl, R₂ is selected from the group consisting of hydrogen and lower alkyl, and R₃ is selected from the group consisting of hydrogen, and organic carboxylic acid ester groups, which comprises subjecting a compound selected from the group consisting of

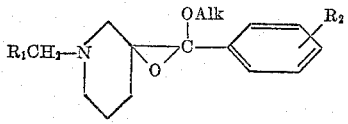

and

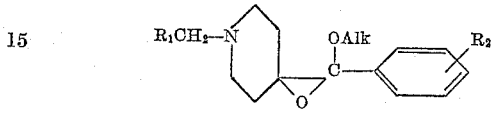

wherein Alk represents lower alkyl, to the action of an acid.

9. A method of making 1-lower alkyl-3-monocyclic aroyl-3-piperidyl lower alkanoic esters which comprises subjecting a 2-lower alkoxy-5-lower alkyl-2-monocyclic aryl-1-oxa-5-azaspiro(2,5)octane to the action of a lower alkanoic acid.

10. A method of making 1-lower alkyl-3-monocyclic aroyl-3-piperidyl monocyclic aroyl esters which comprises subjecting a 2-lower alkoxy-5-lower alkyl-2-monocyclic aryl-1-oxa-5-azaspiro(2,5)octane to the action of a monocyclic arylcarboxylic acid.

11. A method of making 1-methyl-3-benzoyloxy-3-piperidyl phenyl ketone which comprises subjecting 2-methoxy- 5 -methyl-2-phenyl-1-oxa-5-azaspiro(2,5)octane to the action of benzoic acid.

12. A method of making a 1-lower alkyl-3-monocyclic aroyl-piperidinol-3 which comprises subjecting a 2-lower alkoxy-5-lower alkyl-2-monocyclic aryl-1-oxa-5-azaspiro (2,5)octane to the action of hydrochloric acid.

13. Compounds selected from the group consisting of

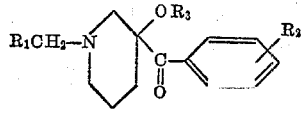

and

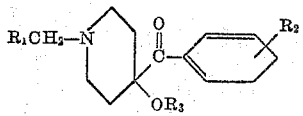

wherein R₁ is selected from the group consisting of hydrogen, lower alkyl and phenyl, R₂ is selected from the group consisting of hydrogen and lower alkyl, and R₃ is selected from the group consisting of hydrogen and organic carboxylic acid ester groups and the water-soluble acid addition salts thereof.

14. 1-lower alkyl-3-monocyclic hydrocarbon aroyl-piperidinol-4-lower alkanoic esters.

15. 1-benzyl-3-monocyclic hydrocarbon aroyl-piperidinol-3-alkanoic esters.

16. 1-lower alkyl-3-monocyclic hydrocarbon aroyl piperidinol-3-monocyclic arylcarboxylic esters.

17. 1-benzyl-3-monocyclic hydrocarbon aroyl-piperidinol-3-monocyclic arylcarboxylic esters.

18. 1-methyl-3-benzoyloxy-3-piperidyl phenyl ketone.

19. 1-methyl-3-benzoyloxy-3-piperidyl phenyl ketone hydrochloride.

20. 1-lower alkyl-3-monocyclic hydrocarbon aroyl piperidinol-3.

No references cited.